United States Patent
Chesko, Sr. et al.

[19]

[11] Patent Number: 5,898,486
[45] Date of Patent: Apr. 27, 1999

[54] PORTABLE MOIRE INTERFEROMETER AND CORRESPONDING MOIRE INTERFEROMETRIC METHOD

[75] Inventors: James Francis Chesko, Sr., Windsor; Yifan Guo, Vestal; Bongtae Han, Endicott; Chun Kil Lim, Vestal, all of N.Y.

[73] Assignee: International Business Machines Corporation, Armonk, N.Y.

[21] Appl. No.: 08/218,000

[22] Filed: Mar. 25, 1994

[51] Int. Cl.$^6$ ..................................................... G01B 9/02
[52] U.S. Cl. ........................................................... 356/35.5
[58] Field of Search .................................. 356/35.5, 244, 356/345, 346

[56] References Cited

U.S. PATENT DOCUMENTS

| | | | |
|---|---|---|---|
| 3,756,723 | 9/1973 | Hock | 356/110 |
| 3,876,304 | 4/1975 | Novak | 356/71 |
| 4,474,466 | 10/1984 | McDonach et al. | 356/32 |
| 4,657,390 | 4/1987 | Doyle | 356/244 |
| 4,726,657 | 2/1988 | Perkins et al. | 356/244 |
| 4,850,693 | 7/1989 | Deason et al. | 356/35.5 |
| 5,187,539 | 2/1993 | Adachi et al. | 356/124 |
| 5,231,468 | 7/1993 | Deason et al. | 356/359 |

OTHER PUBLICATIONS

Experimental Mechanics; "Strain in Transition Joints Measured by High–resolution Moire Photography"; J.M. Webster et al; May 1981.

"A Compact, Economical, And Versatile Moire Interferometer" Mollenhauer (Wright–Patterson AFB OH); Ifju (Hampton VA); Han (IBM Endicott).

"Application of the Moire Method For Measuring Local Deformation Zones" Derganov, Sitnikov and Dubinin.

SPIE vol. 164; "An Automatic Fringe Analysis Interferometer For Rapid Moire Stress Analysis"; McKelvie et al; Univ. of Strathclyde (Scotland).

Optics and Lasers in Engineering, #2 (1980); Stress Analysis Of Fibrous Composites Using Moire Interferometry; McDonach et al.

Experimental Mechanics; "High–sensitivity Moire Interferometry —A Simplified Approach", Post et al; Mar. 1991.

*Primary Examiner*—Samuel A. Turner
*Attorney, Agent, or Firm*—Bernard Tiegerman; John R. Pivnichny

[57] ABSTRACT

A moire interferometer which is both portable and shielded from the environment, as well as a corresponding moire interferometric method, are disclosed.

9 Claims, 4 Drawing Sheets

PORTABLE MOIRE INTERFEROMETER AND CORRESPONDING MOIRE INTERFEROMETRIC METHOD

BACKGROUND OF THE INVENTION

1. Field of the Invention

The invention pertains generally to moire interferometry, and more particularly to a portable moire interferometer and to a corresponding moire interferometric method.

2. Description of the Related Art

Moire interferometry is an optical technique for measuring the in-plane displacements of a specimen under load. As described, for example, in Chapter 4 of the book by Daniel Post, Bongtae Han and Peter Ifju entitled *High Sensitivity Moire* (Springer-Verlag, New York, 1994), and as depicted in FIG. 1, in moire interferometry the specimen surface of interest is provided with a crossed-line diffraction grating, i.e., a diffraction grating having grating lines in two orthogonal directions. This specimen grating deforms together with the specimen when the specimen is subjected to a mechanical or thermal load. Therefore, the in-plane deformations suffered by the specimen grating represent the in-plane deformations suffered by the specimen.

As depicted in FIG. 1, when measuring displacements in, for example, the X-direction via moire interferometry, two mutually coherent beams of light, $B_1$ and $B_2$, of identical wavelength, $\lambda_x$, which lie in the X-Z plane, are impinged upon the specimen grating. These beams are impinged at angles of, respectively, $+\alpha_x$ and $-\alpha_x$, relative to the normal to the specimen surface, and each beam is reflectively diffracted by the specimen grating. Significantly, the angles $+\alpha_x$ and $-\alpha_x$ (which are of equal magnitudes) are chosen so that each incident beam results in a diffraction order, i.e., the +1 diffraction order or the -1 diffraction order, which emerges from the specimen grating perpendicularly to the specimen surface. Such a choice implies that $\alpha_x$, $\lambda_x$ and the specimen grating frequency in the X-direction, $f_{sx}$, satisfy the relationship $$\sin \alpha_x = \lambda_x \cdot f_{sx} \tag{1}$$

The resulting two diffraction orders then interfere with one another to produce a moire fringe pattern, which is readily imaged with a camera, as depicted in FIG. 1. It should be noted that such a fringe pattern constitutes a contour map where displacements in the X-direction, U, are related to fringe order, $N_x$, by $$U = N_x / 2 f_{sx} \tag{2}$$

If displacements in the Y-direction are to be measured, then two mutually coherent beams of light, $B_3$ and $B_4$, of identical wavelength, $\lambda_y$, which lie in the Y-Z plane, are impinged upon the specimen grating. Again, the beams $B_3$ and $B_4$ are impinged at angles of, respectively, $+\alpha_y$ and $-\alpha_y$, relative to the normal to the specimen surface. As before, the angles $+\alpha_y$ and $-\alpha_y$ are chosen so that each incident beam results in a diffraction order which emerges from the specimen grating, perpendicularly to the specimen surface. This implies that $\alpha_y$, $\lambda_y$ and the specimen grating frequency in the Y-direction, $f_{sy}$ satisfy the relationship $$\sin \alpha_y = \lambda_y \cdot f_{sy} \tag{3}$$

The interference between the resulting two diffraction orders then produces a moire fringe pattern which is also readily imaged with a camera. As before, such a fringe pattern constitutes a contour map where displacements in the Y-direction, V, are related to fringe order, $N_y$, by $$V = N_y / 2 f_{sy} \tag{4}$$

Obviously, if the wavelengths $\lambda_x$ and $\lambda_y$ are equal to one another, and these identical wavelengths are denoted by lambda, and if the specimen grating frequencies $f_{sx}$ and $f_{sy}$ are equal to one another, and these identical frequencies are denoted by $f_s$, then it follows from Eqs. (1) and (3) that $$\sin \alpha_x = \sin \alpha_y = \lambda \cdot f_s, \tag{5}$$

and therefore $$\alpha_x = \alpha_y = \alpha. \tag{6}$$

In addition, from Eqs (2) and (4), it follows that $$U = N_x / 2 f_s \tag{7}$$

and $$V = N_y / 2 f_s. \tag{8}$$

Interestingly, the concept of a virtual diffraction grating is sometimes used to explain the above-described diffraction and interference phenomena. That is, it is sometimes imagined that each pair of incident, coherent beams of light, e.g., the pair $B_1$ and $B_2$, initially interfere with one another in front of the specimen grating to form a virtual diffraction grating having a grating frequency, f, where $$f = 2 \cdot \sin \alpha / \lambda = 2 \cdot f_s. \tag{9}$$

It is then imagined that the virtual grating is superimposed upon the specimen grating, and the interaction between the two gratings forms a fringe pattern.

With reference now to FIG. 2, a conventional moire interferometer 10 typically includes a source of coherent light, such as a laser 20. This source serves to produce a collimated beam of coherent light which is impinged upon a beam splitter 30. The latter serves to creates two mutually coherent beams of light, which are directed to mirrors 40 and 50. These mirrors then serve to direct the two coherent beams of light to a specimen diffraction grating 70 mounted on a specimen 60. The two resulting diffraction orders which emerge from the specimen diffraction grating 70 interfere with each other to produce a moire fringe pattern, which is imaged with a camera.

It should be noted that prior to subjecting the specimen 60 to a mechanical or thermal load and imaging the corresponding moire fringe pattern, it is essential that the positions of the mirrors 40 and 50 be initially adjusted to achieve a null field. That is, in the absence of a load on the specimen 60, the positions of the mirrors 40 and 50 must be adjusted so as to achieve a moire fringe pattern which has no fringes, or no more than a minimum number of fringes. Otherwise, the moire fringe pattern produced when the specimen is subjected to a load will contain fringes which are unrelated to the load and are therefore misleading.

Although not shown in FIG. 2, a conventional moire interferometer includes the optical elements, described above, mounted on a relatively large optical table. Consequently, such a conventional moire interferometer is not at all portable, which limits its utility. Moreover, the optical elements of a conventional moire interferometer are necessarily exposed to the surrounding air, and therefore to air currents. But, such air currents can induce changes in refractive index which, in turn, can, for example, alter the optical path length of one of the beams incident on the specimen diffraction grating. Such a change in optical path length can introduce significant errors into the corresponding moire fringe pattern.

One attempt to overcome the lack of portability of conventional moire interferometer is described by D. Mollenhauer, P. G. Ifju and B. Han in "A Compact, Economical and Versatile Moire Interferometer", Proc. 1993 SEM Spring Conference on Experimental Mechanics, Society for Experimental Mechanics, Bethel, Conn., pp. 954–963 (1993). Here, the authors describe a new design for what is, in effect, a portable moire interferometer. In this design, the main structural feature is an aluminum ring, on which all of the optical elements are mounted. One of these optical elements is a crossed-line reference diffraction grating having a grating frequency of 1200 lines per millimeter (lines/mm).

In the operation of the above-described portable moire interferometer, a coherent light beam from a He-Ne laser is communicated by a single-mode optical fiber to optical elements mounted on the aluminum ring, which serve to direct this light beam at normal incidence onto the reference diffraction grating. This beam is then diffracted by both sets of grating lines to produce +1 and -1 diffraction orders in two orthogonal planes. These two pairs of mutually coherent beams of light are then directed by four mirrors mounted on the aluminum ring, two of which are manually adjustable, toward a crossed-line specimen diffraction grating. As a result, moire fringe patterns corresponding to in-plane displacements in both the X- and Y-directions are achieved.

While the above-described moire interferometer is portable and therefore overcomes one of the disadvantages associated with conventional moire interferometers, all of the optical elements of this moire interferometer are still exposed to the surrounding air. Therefore, this moire interferometer is still subject to undesirable changes in refractive index associated with air currents.

Thus, those engaged in the development of moire interferometry have sought, thus far without success, moire interferometers which are both portable and shielded from the surrounding Environment.

SUMMARY OF THE INVENTION

The invention involves a moire interferometer which is both portable and shielded from the surrounding environment. The inventive moire interferometer includes an enclosed box which contains all the optical elements of the interferometer, which are shielded from the environment by the walls of the box. Significantly, by contrast with, for example, the portable moire interferometer designed by Mollenhauer, Ifju and Han, all of the optical elements of the inventive moire interferometer are directly or indirectly, substantially rigidly affixed to various walls of the box. Consequently, the box can readily be transported without causing any relative movement between the optical elements inside the box.

A preferred embodiment of the inventive moire interferometer includes a crossed-line reference diffraction grating inside the box, substantially rigidly affixed to a wall of the box. An optical fiber, which extends through a hole in the box, serves to guide a beam of coherent light from the exterior of the box into the interior of the box. Optical elements which are directly or indirectly, substantially rigidly affixed to various walls of the box, serve to direct the beam of coherent light toward the reference diffraction grating, at normal incidence to the grating. This incident beam is then diffracted by both sets of grating lines to produce +1 and -1 diffraction orders in two orthogonal planes. The resulting four beams of coherent light are subsequently reflected by four mirrors, substantially rigidly affixed to the walls of the box, toward corresponding apertures or windows in a wall of the box. A specimen which is to undergo moire interferometry, and which includes a crossed-line specimen diffraction grating, is positioned on or adjacent to this wall.

Significantly, three of the four mirrors used to guide the four beams of coherent light are adjustable from the exterior of the box. That is, in the case of these three mirrors, knobs which extend through holes in the walls of the box permit the positions of the three mirrors to be adjusted from the exterior of the box. Consequently, a null field is readily achieved before applying a load to the specimen under test.

BRIEF DESCRIPTION OF THE DRAWINGS

The invention is described with reference to the accompanying drawings, wherein.

DETAILED DESCRIPTION OF THE PREFERRED EMBODIMENT(S)

The invention involves a moire interferometer which is both portable and shielded from the environment. The invention also involves a corresponding, moire interferometric method.

Figure 1:
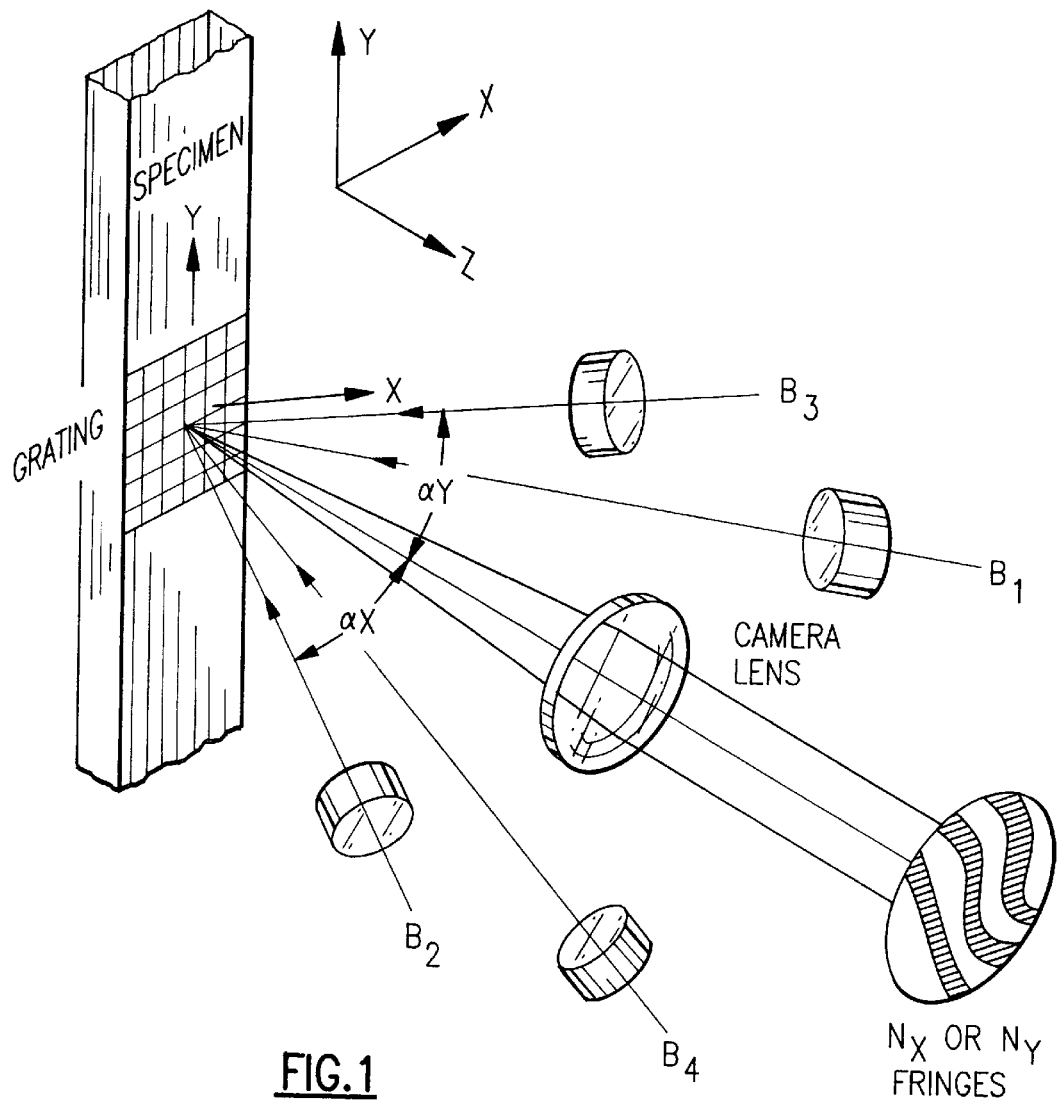
FIG. 1 is a schematic illustration of the incident and diffracted beams of light associated with moire interferometry.
Figure 2:
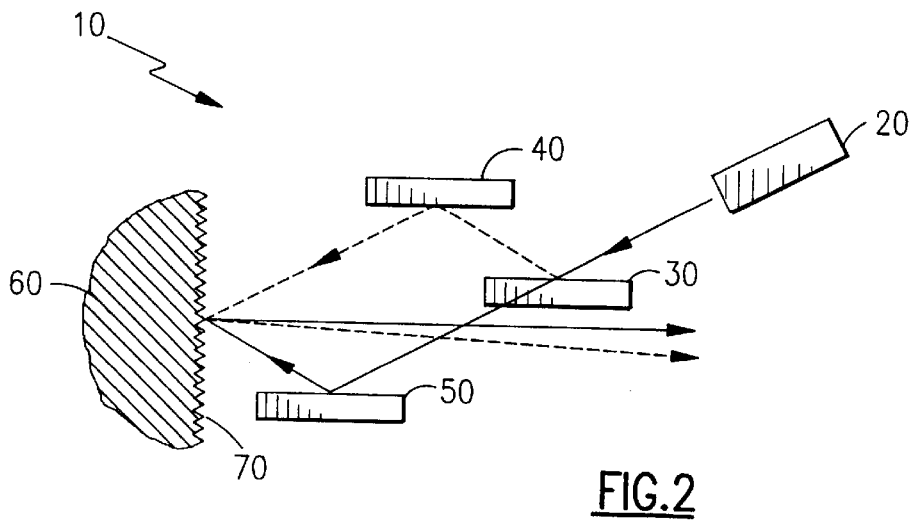
FIG. 2 is a schematic illustration of a conventional moire interferometer.
Figure 3:
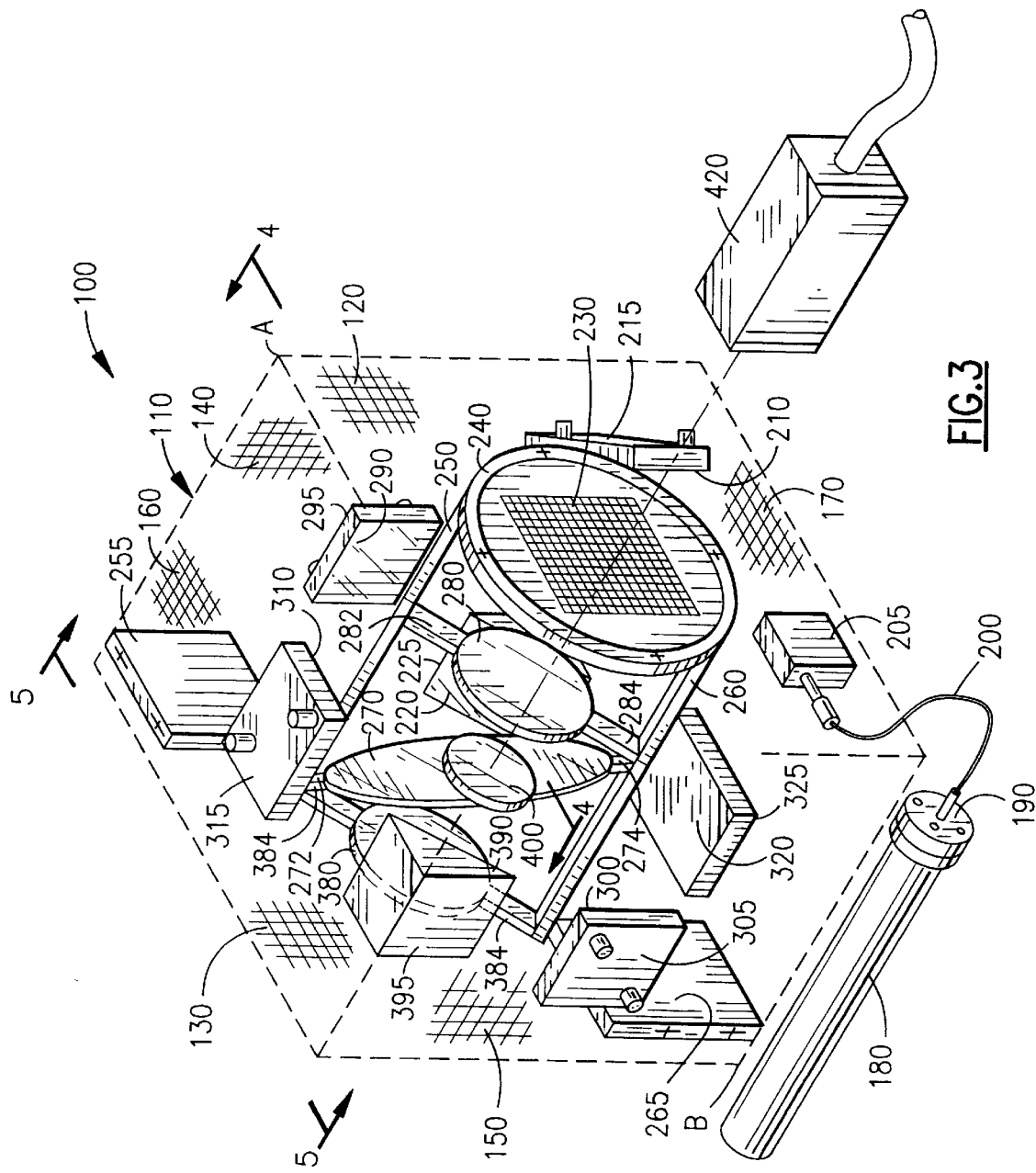
FIG. 3 is in isometric view of the interior of the inventive moire interferometer.

With reference to FIG. 3, a preferred embodiment of the inventive moire interferometer 100 includes an enclosed box 110 having walls 120, 130, 140, 150, 160 and 170. The walls 120 and 130, the walls 140 and 150, and the walls 160 and 170, are substantially parallel to one another. These walls are made out of, for example, aluminum. The width and height of the wall 120, and therefore of the box 110, are preferably each 12 inches. In addition, the width of the wall 150, and therefore the depth of the box 110, is preferably 7 inches.

A laser 180, such as a He-Ne laser, which is external to the box 110 and is not a part of the present invention, serves as a source of coherent light for the inventive moire interferometer 100. A pigtail style fiber coupler 190 is connected to the laser 180. As its name implies, the fiber coupler 190 includes a (single-mode) optical fiber 200 which extends from the laser 180 through a hole in the box 110. This pigtail style fiber coupler 190 serves to guide coherent light produced by the laser 180 from the exterior of the box 110 into the interior of the box 110. The free end of the single-mode optical fiber 200 is connected to a fiber holder 205 in the box 110, which is substantially rigidly affixed to the wall 170 via screws. This fiber holder 205 serves to direct the light guided by the pigtail style fiber coupler 190 toward a mirror 210 (described below) within the box 110. One useful pigtail style fiber coupler 200 is pigtail style fiber coupler model number LPSC-01-633-4/125 sold by OZ Optics Limited, Ontario, Canada.

The free end of the optical fiber 200, and therefore the coherent light guided by the optical fiber 200, is oriented by the fiber holder 205 toward a mirror 210 located at the corner formed by the intersections of walls 120, 140 and 170. This mirror 210 is glued to a mirror holder 215, which is substantially rigidly affixed to the wall 140 with screws. The mirror 210 is preferably a round flat mirror having a diameter of 30 mm and a thickness of 6 mm. One such useful mirror 210 is round flat mirror model 02MFG016 sold by Melles Griot, Incorporated, of Irvine, Calif.

In connection with mirror 210 and mirror holder 215, it should be noted that one useful mirror holder 215 is mirror holder model MM-1, sold by Newport Corporation, Irvine, Calif. Significantly, this mirror holder consists of two platens. The mirror 210 is glued to one of the two platens, which is connected to the second platen by springs. It is the second platen which is substantially rigidly affixed to the wall 140. In addition, and as purchased from the Newport company, the mirror holder 215 includes two screws which extend through the second platen into contact with the first platen. Moreover, as shown in FIG. 3, two knobs are mounted on the free ends of the screws, overlying the second platen. Upon rotating these knobs, the screws serve to move the the first platen relative to the second platen. In this manner, in the course of assembling the moire interferometer 100, the knobs are rotated to correct the position of the mirror 210.

As depicted in FIG. 3, the mirror 210 is oriented at 45 degrees relative to the (coherent beam of light which emanates from fiber coupler 190. As a result, the mirror 210 serves to reflect the coherent beam of light toward mirror 220 glued to mirror holder 225, which is substantially rigidly affixed to the walls 140 and 170 via screws. As shown, the mirror holder 225 is preferably triangular in cross-section, with the mirror 220 being mounted on the hypotenuse of the triangle. The mirror 220 is preferably a round flat mirror having a diameter of 50 mm and a thickness of 10 mm. One such useful mirror 220 is round flat mirror model 02MFG019 sold by Melles Griot, Incorporated, of Irvine, Calif.

Figure 4:
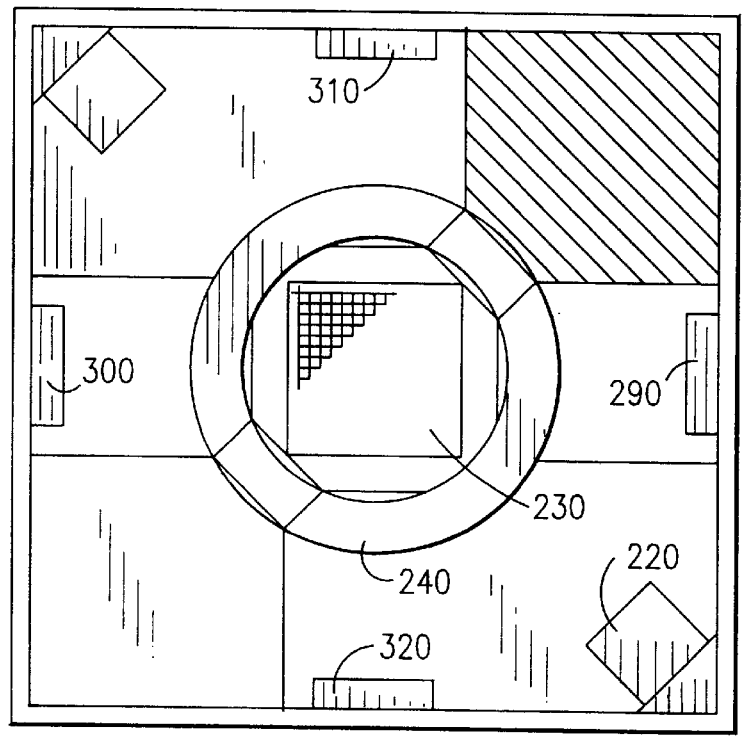
FIG. 4 is a cross-sectional view of the inventive moire interferometer, taken along the line 4—4 in FIG. 3.

Significantly, as shown in FIGS. 3 and 4, the inventive moire interferometer includes a reference diffraction grating 230 which is glued to an aluminum holder (not shown) which, in turn, is substantially rigidly affixed to the wall 120 via screws. This reference diffraction grating 230 is preferably a crossed-line diffraction grating, although a grating having grating lines which extend in only one direction, i.e., the X-direction or the Y-direction, is also useful. The grating frequency of the reference diffraction grating 230 in one (if the grating lines extend in only one direction) or both directions (if the reference grating is a crossed-line grating) is preferably 1200 lines/mm.

Encircling the reference diffraction grating 230 is a circular metallic ring 240, which is also substantially rigidly affixed to the wall 120 via screws. In addition, arms 250 and 260, substantially rigidly connected to the ring 240, project longitudinally toward wall 130 of box 110. As shown in FIG. 3, the arm 250 is connected to a plate 255, while the arm 260 is connected to a plate 265. Significantly, the plates 255 and 265 serve to enhance the rigidity of the structure defined by the arms 250, 260 and circular ring 240.

As shown in FIG. 3, a circular, double-sided mirror 270 is substantially rigidly connected to the arms 250 and 260 via relatively short arms 272 and 274. One such useful double-sided mirror 270 is double-sided mirror blank model 02WBK007 sold by Melles Griot, Incorporated, of Irvine, Calif., mirrorized by an aluminum coating. Because the arms 250 and 260 are substantially rigidly connected to the ring 240, which is substantially rigidly affixed to the wall 120, it follows that the double-sided mirror 270 is indirectly, substantially rigidly affixed to the wall 120.

The double-sided mirror 270 is preferably aligned perpendicularly relative to a diagonal extending from the corner A to the corner B of the box 110. In addition, the double-sided mirror 270 is preferably aligned at an angle of 45 degrees relative to the beam of coherent light which is reflected by the mirror 220 toward the upper surface (as viewed in FIG. 3) of the double-sided mirror 270.

As also shown in FIG. 3, a circular collimator lens 280 is also substantially rigidly connected to the arms 250 and 260 via relatively short arms 282 and 284. This collimator lens 280 is positioned between the double-sided mirror 270 and the reference grating 230. The lens 280 is preferably an achromat, i.e., a doublet which is substantially free of chromatic aberrations. In addition, the diameter and focal length of the lens are preferably 63 mm and 400 mm, respectively. One such useful collimator lens 280 is collimator lens model 01LA0333 sold by Melles Griot, Incorporated, of Irvine, Calif. As before, because the arms 250 and 260 are substantially rigidly connected to the ring 240, which is substantially rigidly affixed to the wall 120, it follows that the collimator lens 280 is indirectly, substantially rigidly affixed to the wall 120.

In the operation of the above-described optical elements, the fiber coupler 190, which includes the optical fiber 200, serves to guide a beam of coherent light produced by the laser 180 into the interior of box 110. Here, this beam of coherent light is initially impinged upon mirror 210, which reflects this beam toward mirror 220. The latter then reflects the beam of coherent light to double-sided mirror 270, which reflects it toward collimator lens 280. This lens collimates the coherent beam of light, which is then impinged upon reference diffraction grating 230 at normal incidence. If the reference diffraction grating 230 is a crossed-line grating, as is preferred, then both sets of grating lines diffract the incident coherent beam to produce +1 and -1 diffraction orders in two orthogonal planes, thereby producing four mutually coherent beams of light. If the reference diffraction grating 230 includes grating lines which only extend in one direction, then these grating lines diffract the incident coherent beam to produce +1 and -1 diffraction orders in only one plane, thereby producing only two mutually coherent beams of light. Thus, the above-described optical elements serve to convert a single, incident coherent beam of light into at least two, and preferably four, mutually coherent beams of light.

If the reference diffraction grating 230 has grating lines which only extend in one direction, and therefore only two mutually coherent beams of light emanate from the reference diffraction grating, then the inventive moire interferometer 100 also includes two parallel mirrors, e.g., mirrors 290 and 300, substantially rigidly affixed to, respectively, walls 140 and 150. These two mirrors 290 and 300 are positioned so as to reflect the two mutually coherent beams of light toward apertures or windows in the wall 130, more fully discussed below. On the other hand, if the reference diffraction grating 230 is a crossed-line diffraction grating, and therefore four mutually coherent beams of light emanate from the reference diffraction grating, then the inventive moire interferometer 100 further includes two additional parallel mirrors, e.g., mirrors 310 and 320, substantially rigidly affixed to, respectively, walls 160 and 170. Under these circumstances, the mirrors 290, 300, 310 and 320 are positioned to reflect the four mutually coherent beams of light toward the apertures or windows in the wall 130.

It should be noted that the mirrors 290, 300, 310 and 320 are preferably glued to, respectively, mirror holders 295, 305, 315 and 325, and it is these mirror holders which are substantially rigidly affixed to the walls 140, 150, 160 and 170 via screws. It should also be noted that each of the mirrors 290, 300, 310 and 320 is preferably a round flat mirror having a diameter of 60 mm and a thickness of 10 mm. A useful mirror 290, or 300, or 310, or 320, is round flat mirror model 02MPG016 sold by Melles Griot, Incorporated, of Irvine, Calif.

Significantly, the mirror holders 295, 305, 315 and 325 are all of the same type as mirror holder 215. Moreover, each of the mirror holders 295, 305 and 315 includes the screws and knobs, described above, but with the knobs extending through holes in walls 140, 150 and 160. Consequently, the positions of the mirrors 290, 300 and 310 are readily adjusted from the exterior of the box 110. This is important because, as discussed more fully below, this permits a null field to be established before a load is applied to a specimen under test.

Figure 5:
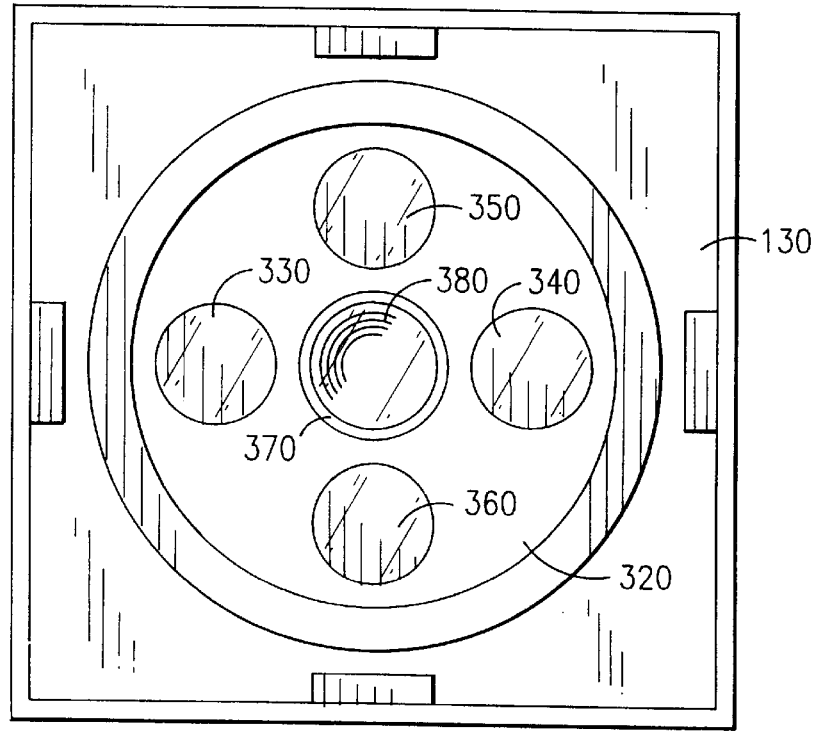
FIG. 5 is an end view of the inventive moire interferometer, looking in the direction defined by the line 5—5 in FIG. 3.

As more clearly shown in FIG. 5, the wall 130 includes a circular plate 327, which is rotatably mounted in the wall 130. In the operation of the inventive moire interferometer 100, a specimen to be tested, having a specimen diffraction grating, is positioned on or adjacent to the plate 327.

If the reference diffraction grating 230 and the specimen diffraction grating have grating lines which extend in one direction only, then the circular plate 327 includes just two apertures or windows, e.g., apertures 330 and 340, through which the two mutually coherent beams of light emanating from the reference diffraction grating 230 and reflected by the mirrors 290 and 300, penetrate to impinge upon the specimen diffraction grating. In addition, an aperture or window 370, centrally positioned between apertures 330 and 340, is also provided in plate 327. It is through this central aperture that the corresponding +1 and −1 diffraction orders emanating from the specimen diffraction grating penetrate into the interior of the moire interferometer 100.

If the reference diffraction grating 230 and the specimen diffraction grating are crossed-line diffraction gratings, as is preferred, then the circular plate 327 includes four apertures or windows, i.e., apertures 330, 340, 350 and 360. It is through these four apertures that the four mutually coherent beams of light emanating from the reference diffraction grating 230 and reflected by the mirrors 290, 300, 310 and 320 penetrate to impinge upon the specimen diffraction grating. In addition, under these circumstances, the corresponding +1 and −1 diffraction orders, in two orthogonal planes, which emanate from the specimen diffraction grating penetrate into the interior of the moire interferometer via the central aperture 370.

With reference once again to FIGS. 3 and 5, the moire interferometer 100 further includes a field lens 380, within the box 110, positioned adjacent the central aperture 370. This field lens 380 is substantially rigidly connected to the arms 250 and 260 projecting from the circular ring 240 via relatively short arms 382 and 384. As before, because the circular ring is substantially rigidly affixed to the wall 120, it follows that the field lens is indirectly substantially rigidly affixed to the wall 120.

Preferably, the field lens 380 is an achromat and has a diameter of 2 inches and a focal length of 200 mm. One such useful field lens 380 is field lens model AAP-250-50.8 sold by CVI Laser Corporation of Albuquerque, N.Mex.

The field tens 380 communicates the light (the diffraction orders) which emanates from the specimen grating to the back-side (as viewed in FIG. 3) of the double-sided mirror 270. This mirror reflects this light to a mirror 390, mounted on mirror holder 395, which is substantially rigidly affixed to the walls 150 and 160 via screws. It should be noted that the mirror 390 and mirror holder 395 are identical to mirror 220 and mirror holder 225.

Significantly, the mirror 390 reflects the light emanating from the specimen grating to imaging lens 400, (movably) positioned near the corner defined by the intersection of walls 120, 140 and 150. This imaging lens serves to image the moire fringe patterns associated with the diffraction orders emanating from the specimen grating onto a camera 420, positioned outside the box 110.

Preferably, the imaging lens 400 is an achromat, and has a diameter of 2 inches and a focal length of 200 mm. One such useful imaging then is imaging lens model AAP-200-50.8 sold by CVI Laser Corporation of Albuquerque, N.Mex.

Figure 6:
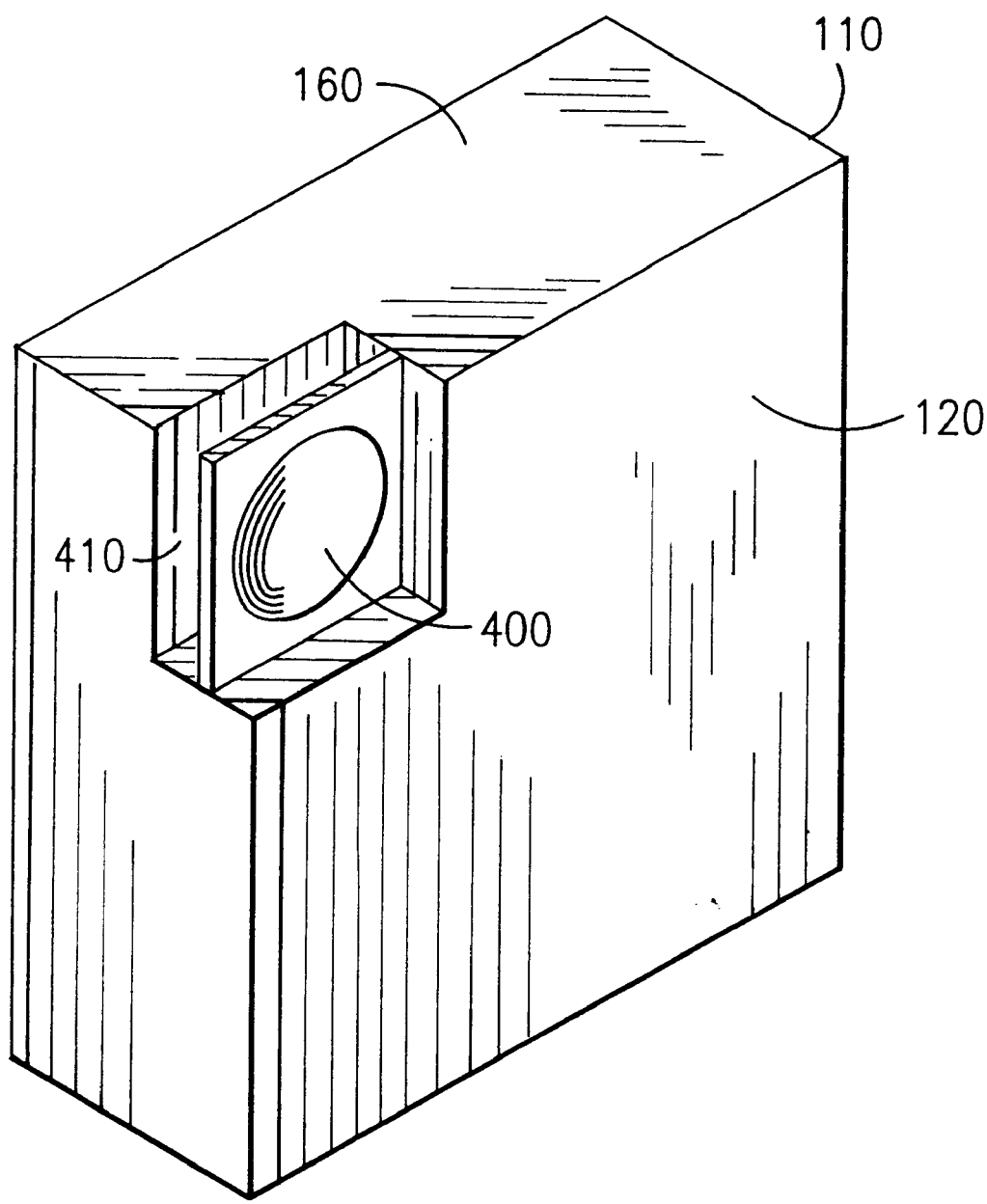
FIG. 6 is another isometric view of the inventive moire interferometer, depicting a feature which is not shown in FIG. 3.

With reference now to FIGS. 3 and 6, it should be noted that FIG. 3 omits a feature of the moire interferometer 100 which is depicted in FIG. 6. That is, right-angle portions of the walls 120, 150 and 160, adjacent to the corner formed by the intersection of these walls, have been excised so as to insert a hollow, rectangular cylinder 410. Significantly, the imaging lens 400 is longitudinally movable along this hollow, rectangular cylinder 410, which allows one to achieve variable image magnification.

With reference now to FIG. 5, during the operation of the moire interferometer 100, when the moire fringe pattern associated with Y-direction displacements is to be obtained, then opaque caps are placed over the apertures 330 and 340, so that only the +1 and −1 diffraction orders lying in the vertical plane (as viewed in FIG. 4) penetrate the apertures 350 and 360 to impinge upon the specimen diffraction grating. On the other hand, if the moire fringe pattern associated with X-direction displacements is to be obtained, the opaque caps are allowed to remain in place over the apertures 330 and 340 and the circular plate 320 is rotated by 90 degrees in the clockwise or counterclockwise direction.

As noted earlier, prior to applying a load to a specimen and imaging the corresponding moire pattern or patterns, it is important to initially achieve a corresponding null field or fields. This is achieved by applying the opaque caps to the appropriate apertures in the circulare plate 320, and then rotating the knobs connected to mirror holders 295 and 305, or to mirror holder 315, until the corresponding null field or fields is achieved, as imaged by camera 420.

While the invention has been particularly shown and described with reference to a preferred embodiment thereof, it will be understood by those skilled in the art that various changes in form and details may be made therein without departing from the spirit and scope of the invention.

We claim:

1. A portable moire interferometer, comprising:
   a box having first, second, third, fourth, fifth and sixth walls, said first and second walls, said third and fourth walls, and said fifth and sixth walls, respectively, being substantially parallel to one another;
   a reference diffraction grating which is contained within the interior of said box and substantially rigidly affixed to said first wall;

at least first, second and third apertures in said second wall, facing said reference diffraction grating, said third aperture being positioned between said first and second apertures;

first means, extending through a hole in a wall of said box, for guiding a beam of coherent light from the exterior of said box to the interior of said box;

second means, located within the interior of said box, for directing said beam of coherent light toward said reference diffraction grating, to thereby produce at least first and second diffracted, coherent beams of light; and third means, also located within the interior of said box, for directing said first and second diffracted, coherent beams of light toward, respectively, said first and second apertures in said second wall, said third means being adjustable from the exterior of said box so that the directions of said first and second diffracted, coherent beams of light may be adjusted from the exterior of said box.

2. The portable moire interferometer of claim 1, wherein said third means includes first and second mirrors mounted on, respectively, first and second mirror holders, said first and second mirror holders being mounted on, respectively, said third and fourth walls, said first and second mirror holders, and therefore said first and second mirrors, being adjustable from the exterior of said box.

3. The portable moire interferometer of claim 1, wherein said reference diffraction grating is a crossed-line diffraction grating, and the positional relationship between said second means and said reference diffraction grating results in the formation of first, second, third and fourth diffracted, coherent beams of light upon the introduction of a coherent beam of light into said box via said first means.

4. The portable moire interferometer of claim 3, wherein said third means also serves to direct said third and fourth diffracted, coherent beams of light toward said second wall, said third means also including third and fourth mirrors mounted on, respectively, third and fourth mirror holders, said third and fourth mirror holders being mounted on, respectively, said fifth and sixth walls, at least said third mirror holder, and therefore at least said third mirror, being adjustable from the exterior of said box.

5. The portable moire interferometer of claim 1, wherein said second means includes:

a ring, substantially rigidly affixed to said first wall and encircling said reference diffraction grating, having first and second arms projecting toward said second wall;

a double-sided mirror, substantially rigidly connected to said first and second arms; and a collimator lens, substantially rigidly connected to said first and second arms, which is capable of optical communication with said double-sided mirror and said reference diffraction grating.

6. The portable moire interferometer of claim 5, further comprising a field lens, substantially rigidly connected to said first and second arms and positioned adjacent to, and being capable of optical communication with, said third aperture in said second wall, said field lens also being capable of optical communication with said double-sided mirror.

7. The portable moire interferometer of claim 6, further comprising:

an imaging lens, located within the interior of said box adjacent the intersection of said first, fourth and fifth walls; and fourth means, located within the interior of said box adjacent the intersection of said fourth and fifth walls and capable of optical communication with said double-sided mirror and said imaging lens, for directing light emanating from said field lens and reflected by said double-sided mirror to said imaging lens.

8. A method for conducting a moire interferometric analysis of a specimen which includes a specimen diffraction grating, comprising the steps of;

positioning said specimen on or adjacent to a portable moire interferometer including a closed box containing optical elements therein, said optical elements including a reference diffraction grating substantially rigidly affixed to a first wall of said box, said specimen being positioned on or adjacent to a second wall of said box which includes at least first, second and third apertures, said third aperture being positioned between said first and second apertures;

introducing a beam of coherent light, via an optical fiber extending through a hole in said box, from the exterior of said box into the interior of said box;

guiding said beam of coherent light, via optical elements within said box, toward said reference diffraction grating, to thereby produce at least first and second reflectively diffracted, coherent beams of light;

guiding said at least first and second diffracted, coherent beams of light, via at least two optical elements within said box having positions which are adjustable from the exterior of said box, toward said first and second apertures, thereby impinging said it least first and second diffracted, coherent beams of light upon said specimen diffraction grating; and reflectively diffracting said at least first and second diffracted, coherent beams of light from said specimen diffraction grating as a light which passes through said third aperture into said box.

9. The method of claim 8, further comprising the steps of:

directing said reflectively diffracted light through said box to the exterior said box; and imaging said reflectively diffracted light with a camera.

* * * * *